US012748996B2

(12) United States Patent
Charbonnier et al.

(10) Patent No.: US 12,748,996 B2
(45) Date of Patent: Sep. 29, 2026

(54) BACK GATE FOR QUANTUM DEVICE

(71) Applicant: COMMISSARIAT A L'ENERGIE ATOMIQUE ET AUX ENERGIES ALTERNATIVES, Paris (FR)

(72) Inventors: Jean Charbonnier, Grenoble Cedex (FR); Myriam Assous, Grenoble Cedex (FR); Thomas Bedecarrats, Grenoble Cedex (FR); Nils Rambal, Grenoble Cedex (FR); Maud Vinet, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 905 days.

(21) Appl. No.: 18/062,353

(22) Filed: Dec. 6, 2022

(65) Prior Publication Data

US 2023/0196167 A1 Jun. 22, 2023

(30) Foreign Application Priority Data

Dec. 16, 2021 (FR) ..................................... 21 13677

(51) Int. Cl.
*G06N 10/40* (2022.01)

(52) U.S. Cl.
CPC .................................... *G06N 10/40* (2022.01)

(58) Field of Classification Search
CPC .. G06N 10/40; H10D 30/014; H10D 48/3835; H10D 64/27; H01L 21/78; B82Y 10/00
See application file for complete search history.

(56) References Cited

U.S. PATENT DOCUMENTS 5,098,178 A * 3/1992 Ortabasi .............. H10N 60/857 428/614
9,117,868 B1 8/2015 Nangoy
(Continued)

FOREIGN PATENT DOCUMENTS

JP 11-4017 A 1/1999

OTHER PUBLICATIONS

French Preliminary Search Report and Written Opinion issued Aug. 31, 2022 in French Application 21 13677, filed on Dec. 16, 2021 (with English Translation of Categories of Cited Documents), 13 pages.

(Continued)

*Primary Examiner* — Jack Chiang
*Assistant Examiner* — Brandon Bowers
(74) *Attorney, Agent, or Firm* — Oblon, McClelland, Maier & Neustadt, L.L.P.

(57) ABSTRACT

A spin Qbits quantum device includes a substrate of the semiconductor on insulator type provided with a surface semiconductor layer disposed on an insulating layer, the insulating layer being arranged on an upper face of a semiconductor support layer, and a component formed of one or more quantum islands extending in the surface layer and one or more gate electrodes for electrostatic control of the islands. Front gate electrodes are disposed on the surface layer, and the component includes a back electrostatic control gate formed of a conductive layer lining lateral walls and a bottom of an opening passing through the support layer from a lower face opposite the upper face up to the insulating layer. The conductive layer is disposed at the bottom of the opening in contact with the insulating layer, the conductive layer being disposed in contact with the support layer at the lateral walls.

10 Claims, 9 Drawing Sheets

(56) References Cited

U.S. PATENT DOCUMENTS

| | | | |
|---|---|---|---|
| 2013/0087766 | A1 | 4/2013 | Schenkel et al. |
| 2017/0104123 | A1* | 4/2017 | Ma ........................ H10F 71/139 |
| 2018/0145052 | A1* | 5/2018 | Dasgupta .......... H01L 21/02381 |
| 2018/0192521 | A1* | 7/2018 | Shpaisman ............ H05K 3/061 |
| 2019/0123183 | A1* | 4/2019 | Hutin .................. H01L 21/2652 |
| 2019/0266509 | A1 | 8/2019 | Hutin et al. |
| 2019/0392917 | A1* | 12/2019 | Leipold ............... G06F 11/0724 |
| 2020/0161455 | A1 | 5/2020 | Singh et al. |
| 2020/0227523 | A1* | 7/2020 | Leipold .................. G06N 20/00 |
| 2021/0296473 | A1 | 9/2021 | Singh et al. |
| 2021/0343243 | A1* | 11/2021 | Takahashi ............ G09G 3/3233 |
| 2022/0045016 | A1* | 2/2022 | Jeng .................... H01L 23/5386 |

OTHER PUBLICATIONS

De Franceschi, S. et al. "SOI technology for quantum information processing" arxiv.org, Cornell University Library, 201 Olin Lbrary Cornell University Ithaca, NY 14853, Dec. 18, 2019, pp. 1-4.

Bäuml, C. et al. "Supercurrent and phase slips in a ballistic carbon nanotube embedded into a van der Waals heterostructure" arxiv.org, Cornell University Library, 201 Olin Lbrary Cornell University Ithaca, NY 14853, Mar. 22, 2021, pp. 1-11.

* cited by examiner

BACK GATE FOR QUANTUM DEVICE

TECHNICAL FIELD

The present application relates to the field of electronic devices and in particular that of quantum devices formed of semiconductor islands and using, apart from front gate electrodes located above the islands, at least one back control electrode arranged below the level in which the islands are located.

PRIOR ART

Quantum islands (sometimes also called quantum boxes or quantum dots) form base elements of a quantum electronic device. Quantum islands are typically formed in a layer of semiconductor material wherein potential wells are implemented to confine carriers, electrons or holes, in the three dimensions of space. Quantum information is then coded by way of the spin of the carrier. We then speak of spin Qbits (or qubit).

According to one approach, electrons are confined by field effect under gate electrodes similar to those of transistor structures and the information is encoded in the spin of these electrons. These so-called "front" gates are disposed above all of the quantum islands.

The possibility of applying a potential under an insulation layer, or a buried oxide (BOX), or rather a back gate makes it possible to adjust the depth of the potential well and thus better control the potential profile and therefore the manipulation of electrons and of their spins.

The back gate is an additional electrode located below all of the quantum islands.

This type of quantum device generally operates at very low temperature which implies that if it is desired to produce the back gate in semiconductor material, it must be very highly doped so that the gate can be conductive and functional.

Yet, doping a substrate very highly by ion implantation risks inducing residual dopants or generating crystalline defects in a semiconductor layer wherein the islands are provided. This is not compatible with a correct operation of a quantum device.

Another method that would include a plate offset step with an area already doped to produce the back gate would for its part have the drawback of being complicated to implement and of inducing a significant method variability.

Another method that would consist in producing the back gate by structuring the front gate then forming a conductive via for its part poses problems in terms of mechanical stresses exerted on the structure.

The problem arises of finding a quantum device provided with at least one component equipped with a back control electrode as well as a method for producing such a device and that is improved in relation to the above-mentioned drawbacks.

DESCRIPTION OF THE INVENTION

Consequently, one aim of the present invention is to offer a spin Qbits quantum device comprising a substrate of the semiconductor on insulator type, the substrate being provided with a surface semiconductor layer, the surface semiconductor layer being disposed on an insulating layer, the insulating layer being arranged on an upper face of a semiconductor support layer, the device being equipped with at least one component formed of one or more quantum islands extending in the surface semiconductor layer and of one or more so-called "front" gate electrodes for the electrostatic control of the quantum islands, said front gate electrodes being disposed on the surface semiconductor layer, the component C being further provided with a so-called "back" electrostatic control gate, said back control gate being formed of a conductive layer lining lateral walls and a bottom of an opening passing through said semiconductor support layer from a lower face of said support layer opposite said upper face up to said insulating layer of the substrate, said conductive layer being disposed, at the bottom of the opening against and advantageously in contact with said insulating layer of the substrate, said conductive layer being disposed against and in contact with said semiconductor support layer at said lateral walls of said opening.

Such a back gate arrangement makes it possible to control the islands closer while making it possible to maintain a good mechanical resistance and in particular protecting the device from too many mechanical stresses.

Advantageously, said opening includes a void volume, that is to say not filled or filled with air, and which extends from the conductive layer up to a mouth of said opening.

According to a possible implementation, the conductive layer further extends beyond said opening over said lower face of the support layer.

The conductive layer may extend over a given region of said lower face of the support layer and may be structured so as to include patterns on this given region.

According to a particular embodiment said opening may have a flared shape of said bottom up to a mouth of said opening and provided so that said lateral walls of the opening are inclined in relation to a normal to a main plane of said support layer. In this case, the opening may have a flared shape of said bottom up to a mouth of said opening.

According to a possible implementation, the conductive layer may be formed of a stack comprising a conductive bonding layer, and a metal layer made of a material having supraconductive properties.

According to another aspect, the present invention provides a method for manufacturing a device such as defined above.

The present invention in particular relates, to a method for manufacturing a spin Obits quantum device such as defined above and comprising, in this order, steps of:

a) providing or producing a structure comprising, said substrate equipped with one or more quantum islands extending in the surface semiconductor layer and with one or more front electrostatic control gates of the quantum islands disposed on the surface semiconductor layer,
b) forming, through the lower face of the support layer, the opening then,
c) depositing the conductive layer in the opening so as to form the back electrostatic control gate.

Advantageously, the method may further comprise: producing one or more scribe trenches or holes in the support layer so as to produce a scribe line in the support layer.

According to a possible implementation, the one or more scribe trench(es) or holes may produce a contour around the opening.

Advantageously, the production of one or more scribe holes or scribe trenches in the support layer and the formation of the opening may be performed by etching and concomitantly.

According to a possible implementation, the deposition of the conductive layer may also be performed in the one or more scribe trench(es) or holes.

The method may then further comprise steps of:

forming a masking covering said opening, removing by etching the conductive layer facing the scribe trench(es) or holes while protecting the opening by way of the masking, Advantageously, the method may, further comprise, after step c) steps of:

gluing an adhesive tape against the lower face or a layer or a stack dispose the lower face of the support layer, stretching the adhesive tape so as to produce a division of the substrate at the scribe line(s), According to a possible implementation, the opening may be produced by deep etching through a mask.

Typically, a turning over of the substrate beforehand is performed before carrying out such an etching.

According to a possible embodiment for which the front electrostatic control gates are covered with a stack of layers and for which between step a) and step b) a temporary handle support is glued on said stack, the method may further comprise after c) a step of removing said temporary support.

BRIEF DESCRIPTION OF THE DRAWINGS

The present invention will be better understood based on the following description and appended drawings wherein.

The present invention will be better understood upon reading the description of examples of embodiment given, purely by way of indicative and non-limiting example, while referring to the appended drawings wherein.

Identical, similar or equivalent portions of various figures bear the same numerical references such as to facilitate the change from one figure to the other.

The various portions shown in the figures are not necessarily according to a uniform scale, in order to make the figures more readable.

Figure 1:
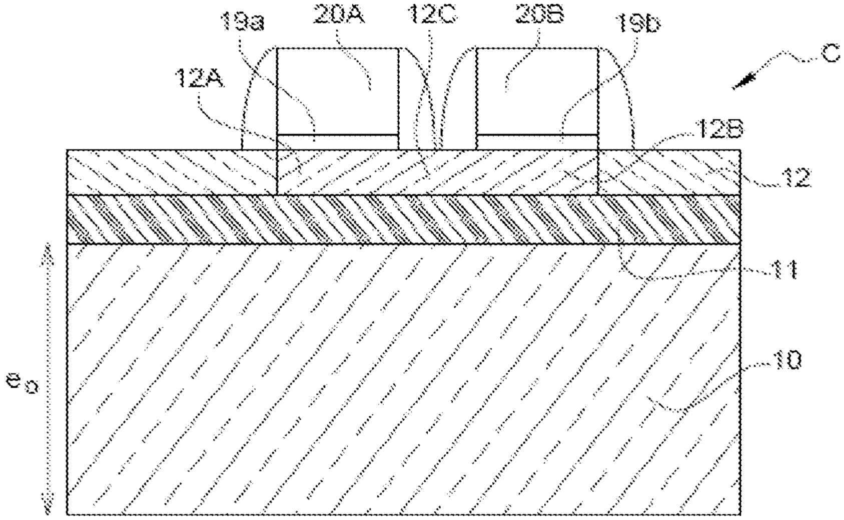
FIG. 1 is used to illustrate an example of quantum component whereon a back gate is intended to be formed and that is likely to be integrated into a quantum device, such as implemented in accordance with the present invention.
Figure 2A:
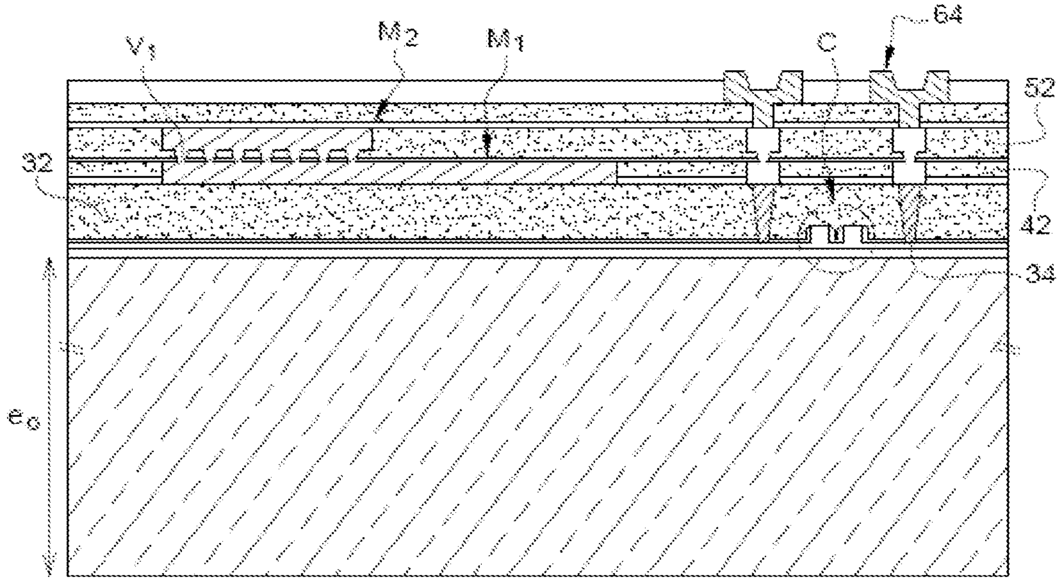
FIGS. 2A, 2B, 2C, 2D, 2E, 2F, 2G, 2H, 2I, 2J are used to illustrate one example of method, according to one embodiment of the present invention, for manufacturing a quantum device and a back gate for quantum component.
Figure 6:
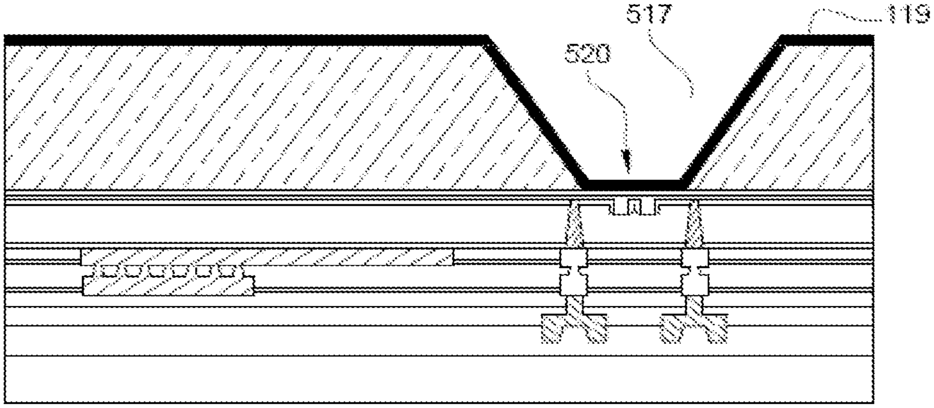
FIG. 6 is used to illustrate a quantum device equipped with a back gate formed in a flared receiving opening made in the semiconductor support layer of a semiconductor on insulator support.

Furthermore, in the description hereafter, terms that depend on the orientation of the structure such as "front", "back", "upper", "lower" "lateral", are applied by considering that the structure is oriented in the manner illustrated in FIG. 1, 2A, or 6,

DETAILED DESCRIPTION OF PARTICULAR EMBODIMENTS

Reference is made firstly to FIG. 1 that gives a sectional view of an example of quantum component C, in particular with spin Qbits, during manufacturing, and that is likely to be integrated into a quantum circuit chip implemented in accordance with the invention.

The component is formed on a substrate that may be of the semiconductor on insulator type and that includes a support layer 10 made of semiconductor material, a buried insulating layer 11 disposed on the support layer 10 and a semiconductor surface layer 12 disposed on the insulating layer. The substrate is typically a SOI (Silicon On insulator) substrate, the surface layer 12 of which is made of silicon, in particular of $^{28}$Si when this layer is required to receive electron spin qubits. Other semiconductor materials may be envisaged for the surface semiconductor layer 12, in particular, when this layer is required to receive hole spin qubits.

The insulating layer 11 and the support layer 10 are typically respectively, a silicon oxide layer commonly called "BOX" (Buried Oxide) and a silicon-based layer. The thickness of the surface layer 12, is for example between approximately 5 nm and 50 nm, typically in the order of 10 nm. The thickness of the buried insulating layer 11, is for example between approximately 10 nm and 200 nm, for example in the order of 145 nm.

The support layer 10 may for its part be provided for example with a thickness $e_0$ between 30 µm and 725 µm, typically 725 µm or 775 µm.

In the embodiment described here, the component C includes at least two confinement regions 12A, 12B located in one portion of the surface semiconductor layer 12, these regions 12A, 12B being coupled and juxtaposed, a first of these regions forming a Qbit, whereas the other region forms a detection element. Each qubit and detection element is provided with a front gate, referenced 20*a* and 20*b*, each of the gates resting on a gate dielectric 19*a*, 19*b*. The two confinement regions 12A, 12B here are connected by means of a coupling region 12C between the confinement regions 12A, 12B.

The quantum coupling between the confinement regions 12A, 12B or more particularly the level of potential of the tunnel barrier formed by the region 12C may be modulated thanks to the addition of a back gate intended to be formed later in the support layer 10. To make it possible to accurately position the component C in relation to a back gate location, alignment marks (not shown) may be provided on the lower face 10B of the support layer 10. Such marks may be detected by an optical system using an infra-red beam passing through the support layer 10.

After having typically produced a plurality of quantum components of the type of that described above, contacts and connection elements of one or more interconnection levels are formed by carrying out one or more steps of depositing insulating layer(s), for example of $SiO_2$, of producing opening(s) in this or these layer(s), of depositing metal material (s).

In the particular example of embodiment illustrated in FIG. 2A, the component C is thus covered with a stack of insulating layers comprising a so-called "pre-metal" dielectric (PMD) material layer 32, for example an oxide layer that may be in the order of 400 nm of thickness. This layer or this stack is planarised by CMP (Chemical Mechanical Polishing) and holes are made to form connection elements 34 made of metal material.

The so-called "pre-metal" dielectric (PMD) material layer 32 here is covered with other insulating layers 42, 52, wherein a first metal level M1 and a second metal level M2 of interconnection are in this example formed with vertical connection elements V1 (commonly called "vias") between the levels M1, M2. The metal levels here are topped with conductive access pads 64, for example made of aluminium flush with the stack of insulating layers.

It is subsequently desired to form in the support layer 10 one or more back gate electrodes and in particular at least one back gate electrode for the component C described above.

Figure 2B:
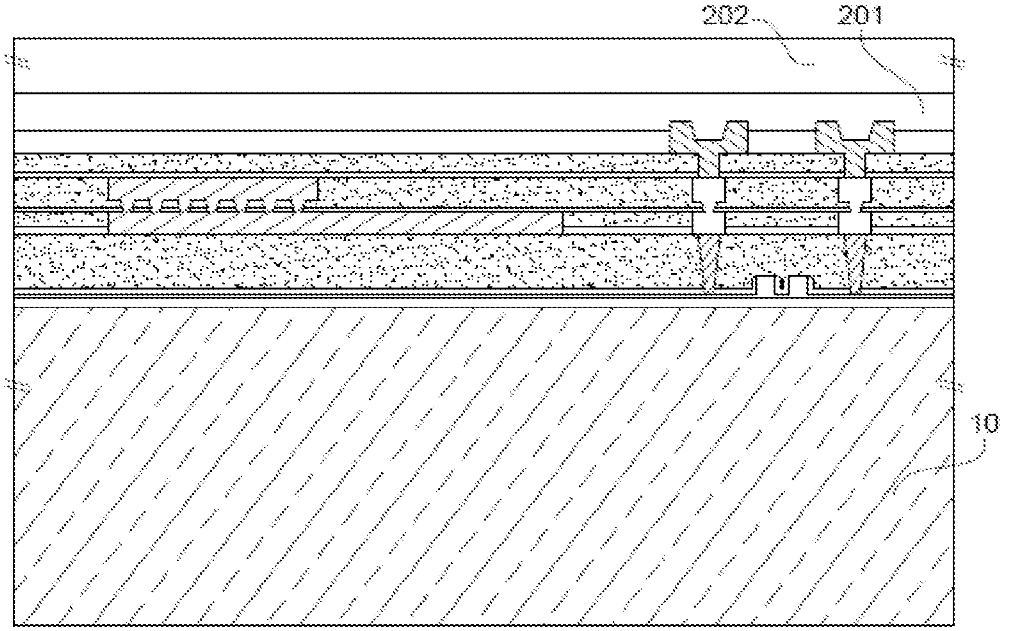

In the example of embodiment illustrated in FIG. 2B, prior to a structuring of the support layer 10, a temporary support 202 is adjoined on the stack of insulating layers. The temporary support 202 is thus disposed on the upper face side of the substrate and makes it possible to produce a protection and a mechanical resistance of the assembly during subsequent structuring of the support layer 10.

The temporary support 202 may be for example made of semiconductor material, in particular made of silicon and may have a thickness between 400 μm and 800 μm, for example in the order of 725 μm. The temporary support 202 may be assembled with the substrate by way of a glue 201, that is spread beforehand on the stack wherein the connection elements 64, M1, M2, V1, 34 are formed. A step of cleaning the lateral edges of the substrate is typically performed after the temporary gluing of the support 202.

The glue 201 used may be a glue rendered liquid at high temperatures, in particular higher than 200° C. For example, a liquid glue of the BSIO1A type developed by Brewer Science, Inc. (BSI) is selected.

Figure 2C:
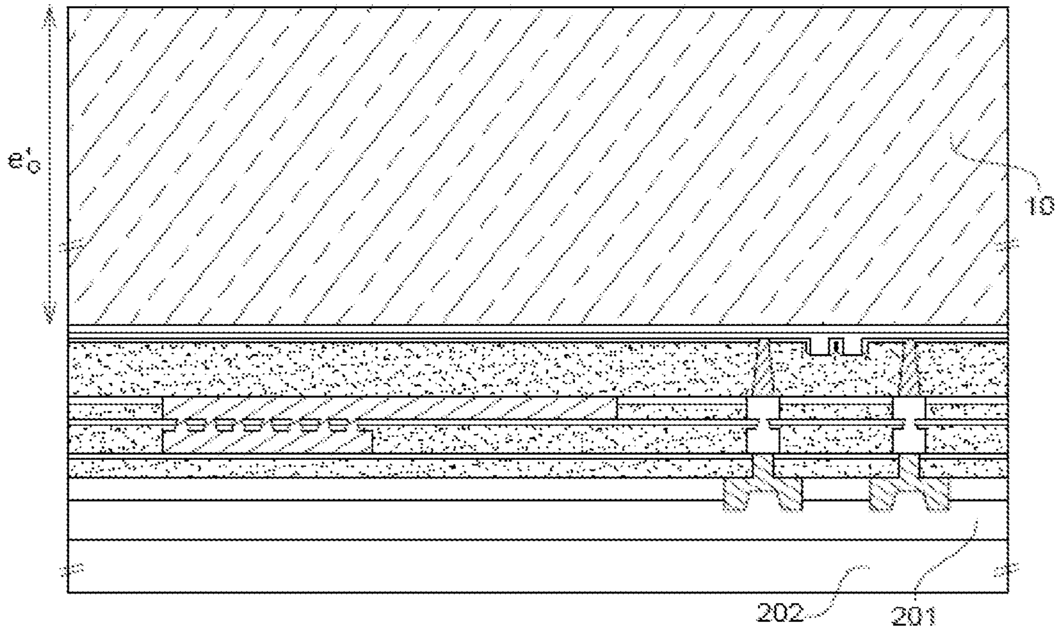

In FIG. 2C (the substrate being turned over in this figure), an optional step of reducing the thickness of the support layer 10, at present noted $e'_0$ and such that $e'_0<e_0$ is carried out in order to facilitate a subsequent structuring of the latter.

This reduction in thickness may be performed in successive thinning substeps.

A first thinning of a thickness for example in the order of 200 μm may be carried out. This first thinning may be followed by a second thinning of a thickness for example in the order of 120 μm.

Between the thinnings, it is possible to envisage steps of trimming and of measuring the residual thickness.

Each thinning may comprise a Deep Reactive Ion Etching (DRIE) method. For a silicon support 10 this method is performed for example by alternating a silicon etching phase by using a fluorine-based (sulphur hexafluoride SF6) plasma and a fluorocarbon chemistry-based phase.

For example, a thickness $e'_0$ of the support layer 10 between 30 and 200 μm, advantageously between 120 μm and 180 μm is maintained.

Subsequently, one or more openings are produced in the support layer 10 particularly in order to form one or more back gate locations.

Figure 2D:
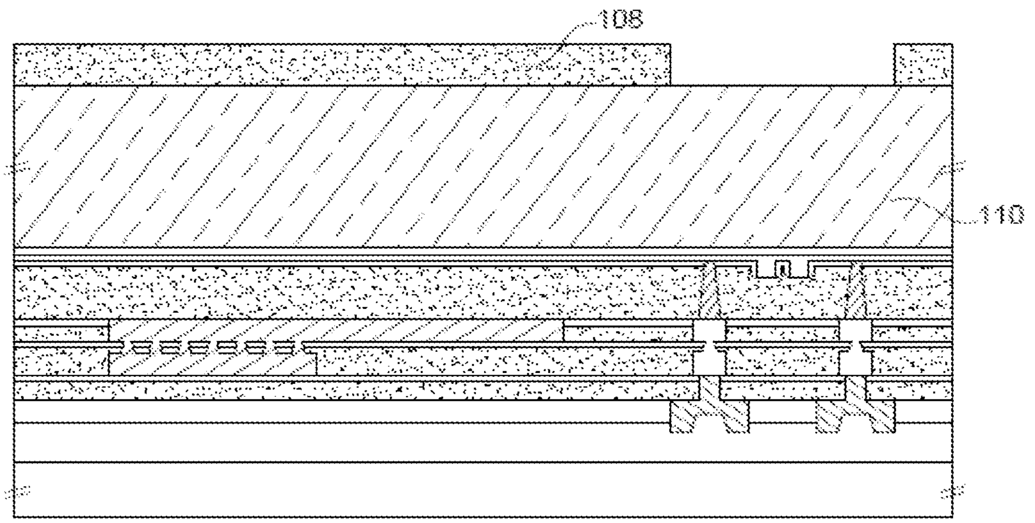

In the example of embodiment illustrated in FIG. 2D, for this a mask 108 is produced, for example made of photosensitive resin, on the support layer 10 and the patterns of the mask are reproduced in the support layer 10. The reproduction of patterns may be performed by Deep Reactive Ion Etching (DRIE) for example by a method of the type commonly called "Bosch". An etching method similar to that making it possible to form connection elements through the silicon commonly called TSV (Through Silicon Vias) may be implemented. The mask 108 is subsequently removed.

According to a possible implementation, it is advantageously possible to envisage concomitantly producing the back gate receiving opening(s): one or more scribe trenches in the support layer 10.

Figure 2E:
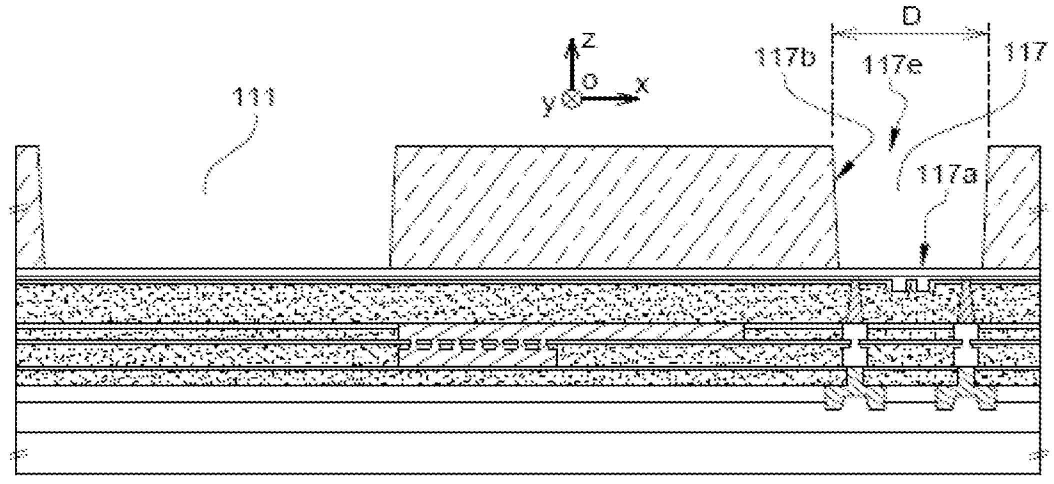

Thus, in the example of embodiment illustrated in FIG. 2E, apart from an opening 117 for receiving a back gate for the component C, a trench 111 forming a scribe line is produced. The trench 111 and the back gate opening 117 here have been produced simultaneously by etching the support layer 10 of the substrate through the same mask.

The opening 117 for receiving the back gate here has a bottom 117*a* located at the insulating layer 11 of the substrate and in this particular example the bottom 117*a* is formed by this insulating layer 11. The opening 117 is provided with lateral walls 117*b* formed by the semiconductor support layer 10 of the substrate. It is possible to provide an opening 117 of diameter D (dimension measured parallel to the plane [O; x; y] of the orthogonal reference frame [O; x; y; z] given in FIG. 2E) at its mouth that may be between 500 and 10 μm, for example 20 μm. The opening 117 is produced with a depth H (dimension measured parallel to the z-axis of the orthogonal reference frame [O; x; y; z] given in FIG. 2E) of the bottom 117*a* up to its mouth 117*e* that may be in the order of the thickness of the support layer 10, for example in the order of 120 μm.

Figure 2F:
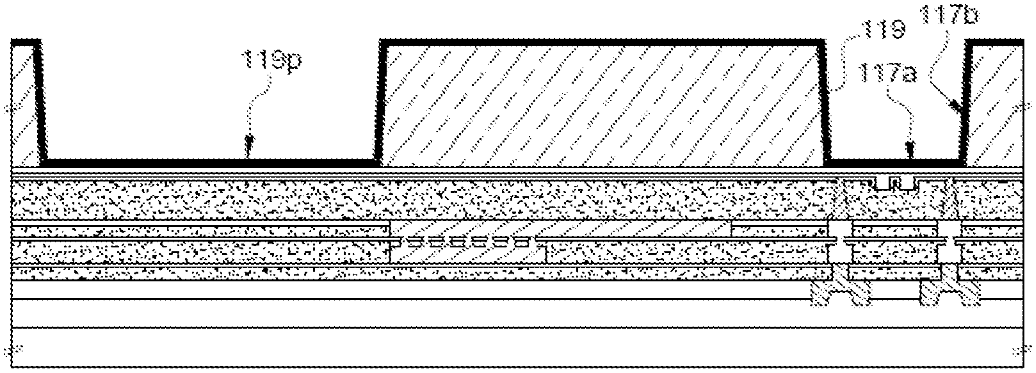

Subsequently, at least one conductor material is deposited in the opening 117 for receiving the gate (FIG. 2F). In the example of embodiment illustrated, this is carried out by a method of conformal deposition of at least one conductive layer 119. Preferably, a layer or a stack made of material having supraconductive properties is selected, in particular at a temperature T lower than 2 K.

The conductive layer 119 may be formed of a stack comprising a bonding layer, for example made of Ti, and a metal layer, for example made of Cu or made of a material having supraconductive properties and preferably capable of being easily conformally deposited, for example a material selected from one of the following materials: TiN, Ru, Nb. This stack lines the bottom 117*a* and the lateral walls 117*b* of the opening 117. It is possible to provide a bonding layer of thickness between 5 nm and 500 nm, for example in the order of 50 nm, and a metal layer made of material having supraconductive properties of thickness between 5 nm and 500 nm, for example in the order of 50 nm, the thickness of these layers being provided depending on the dimensions of the opening 117 and preferably so as to line the latter without filling it.

In this example of embodiment, the conductive layer 119 is thus in contact with a semiconductor material at the lateral walls 117*b* and with an insulating material at the bottom 117*a*, and in particular the insulating material of the insulating layer 11 of the substrate. The conductive layer 119 may be produced by the technique of Physical Vapour Deposition (PVD) or advantageously by Chemical Vapour Deposition (CVD), A particular method envisages producing a bonding layer by iPVD (ionised PVD) and the supraconductive layer by CVD.

Thus, metallisation is carried out without needing to produce an electrical insulation at the lateral walls 117*b* insofar as the semiconductor material of the support layer 10, typically silicon, is insulating at the operating temperature of the quantum device. This quantum device can operate at low temperature in particular at temperatures lower than a plurality of Kelvin, advantageously lower than 2 K and for example equal to 1 K.

Figure 2G:
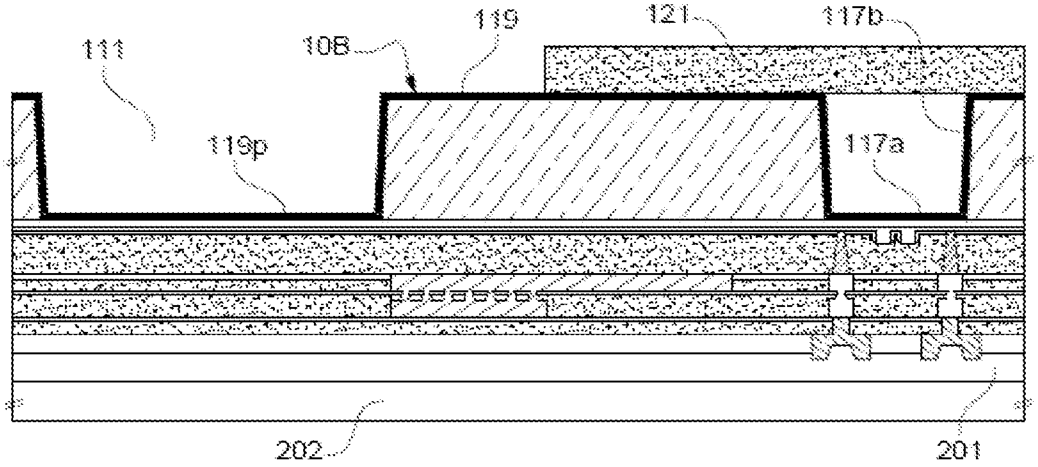

An optional step of removing the conductive layer 119 at the scribe trench 111 may subsequently be carried out. In the particular example of embodiment illustrated in FIG. 2G, a masking 121 is disposed on the lower face 10B side of the support layer 10 and above the opening 117, without covering the lateral walls 117*b* or the bottom 117*a* of the latter. According to a particular example of embodiment, the masking 121 may be a dry layer of photosensitive resin produced by rolling, such as for example an MX5015™ resin developed by Dupont™.

Figure 2H:
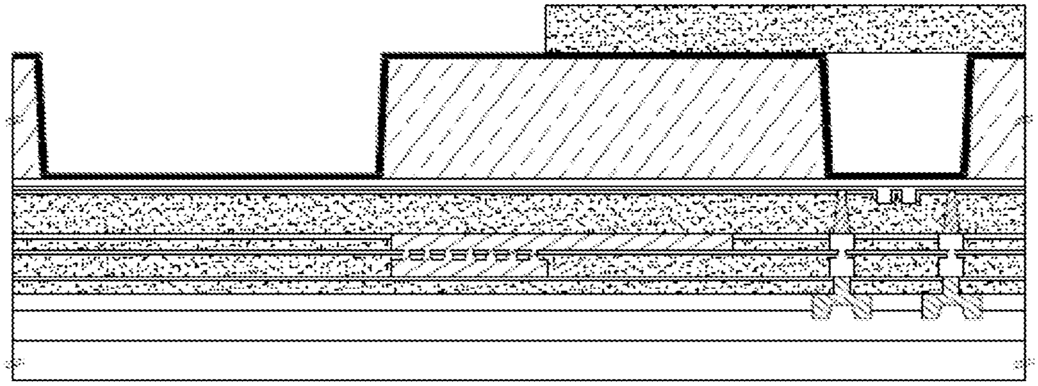

Subsequently, portions 119*p* of the conductive layer 119 that are not covered by the masking 121 and that are thus uncovered are etched. In particular, these portions 119*p* are removed at the trench(es) 111 formed in the support layer 10 (FIG. 2H). The removal of portions 119*p* of the conductive layer 119 out of areas where it is desired to form the back gate(s) and possible contacts for this or these gate(s), makes it possible to release the stresses exerted by the layer 119 on the structure.

Figure 7:
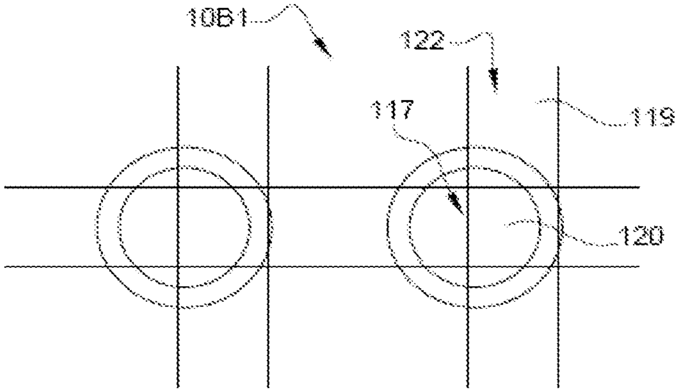
FIG. 7 is used to illustrate patterns produced in a conductive layer in the back face of a quantum device and connected to one or more back gates.

This step may also be the occasion to produce patterns 122 in the conductive layer 119 at the lower face 10B of the support layer 10. This may make it possible to define contact pads in the rear face as well as distinct areas of polarisation of the back gate. This may also make it possible to release the stress exerted by the conductive layer 119 on the rest of the structure. In relation to a production of a continuous plane, this may also make it possible to reduce the parasitic capacities. A particular example of embodiment is illustrated in FIG. 7, the patterns 122 here being in the form of metal strip crossovers at the level of which the back gates 120 are arranged.

The masking 121 may subsequently be removed.

Then, a division of the substrate into a plurality of portions is performed in order to separate between them integrated circuits formed on this substrate. The division is performed by following the scribe line(s) produced beforehand. Such a division may be performed by a scribing method implementing steps of scratching and breaking, of mechanical sawing, or of laser cutting.

Figure 2I:
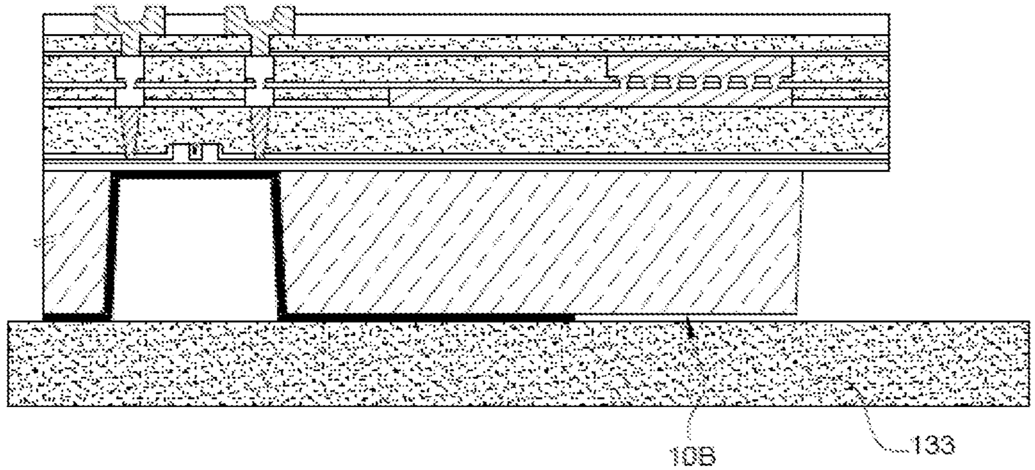

Prior to this division, it is possible to carry out a removal of the temporary support 202 and of the glue 201 used to assemble this support 202 with the stack of layers formed on the substrate, and an adhesive flexible tape 133 is formed or glued on the lower face 10B side of the support layer 10 (FIG. 2I). The adhesive tape 133 is advantageously a stretchable tape having a thickness and a composition provided to make it possible for it to be extendible. For example, the adhesive tape may be based on a polyolefin, acrylic, PET (polyethylene terephthalate), or according to a particular example of embodiment be an adhesive tape of the "Furukawa Electric" brand found on the market under the reference SP-537T.

Figure 3A:
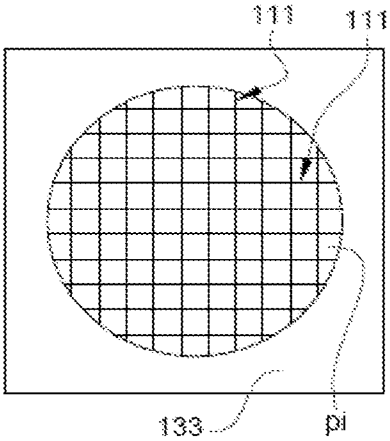
FIGS. 3A, 3B are used to illustrate a substrate division in order to obtain a plurality of elementary chips by stretching an adhesive tape glued on a substrate wherein one or more scribe lines have been formed beforehand.
Figure 3B:
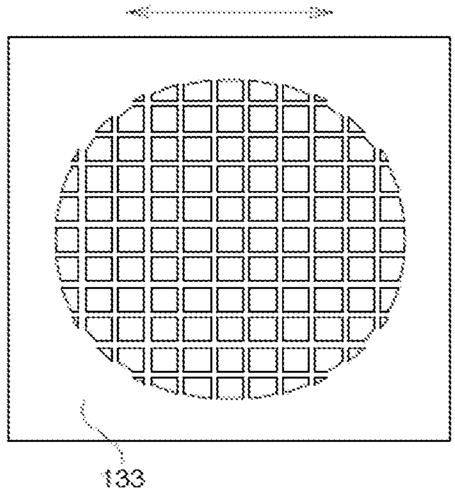

When the scribing of the substrate is performed, for example by a sawing or scribing method, the tape 133 makes it possible to provisionally hold the assembly secure. As a variant or in combination, it is possible to carry out the division by stretching the adhesive tape 133. Thus, in the example of embodiment illustrated in FIGS. 3A-3B, the adhesive tape 133 is stretched to make it possible to separate portions of the substrate corresponding to various elementary chips pi and the division is implemented without another scribing. The prior production of scribe trenches 111 in combination with an expansion of the adhesive tape 133 may suffice.

Figure 2J:
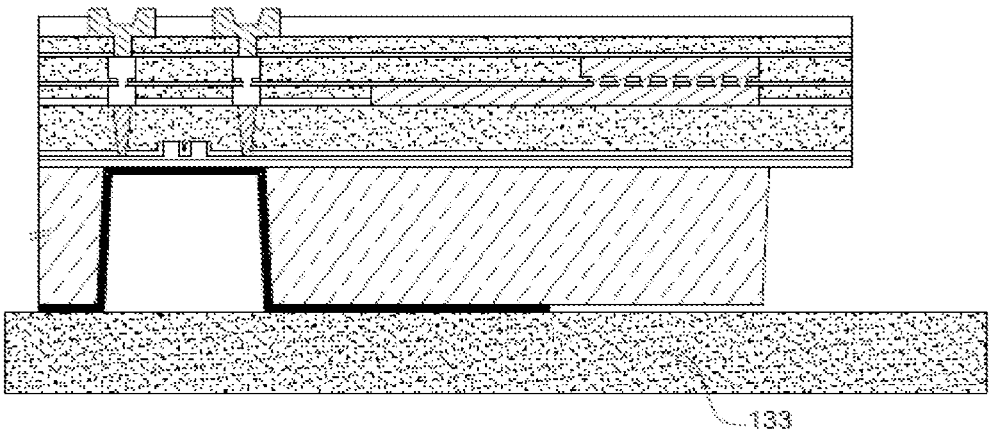

Once the division has been performed, it is subsequently possible to perform the complete separation (FIG. 2J) of elementary circuit chips pi from one another, by removing the tape 133 from the surface of the latter.

In the example of embodiment described above, advantageously, at least one scribe trench 111 is formed concomitantly with the opening 117 for receiving the back gate. As a variant, two distinct steps may be performed for producing the opening and the scribe line.

Figure 4A:
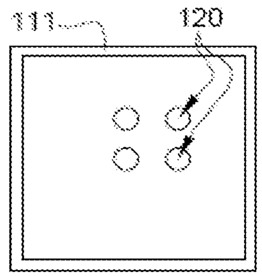
FIGS. 4A, 4B, 4C are used to illustrate the implementation of holes or trenches around the back gate in order to produce a continuous or discontinuous scribe line.

According to a possible arrangement and in order to facilitate the scribing, the trench 111 may be formed in such a way as to produce a closed contour, for example of rectangular or square shape. Thus, in the example of embodiment illustrated in FIG. 4A giving a schematic bottom view, the separation trench 111 between an integrated circuit chip and other adjacent circuit chips produces a closed contour around the back gates 120.

Figure 4B:
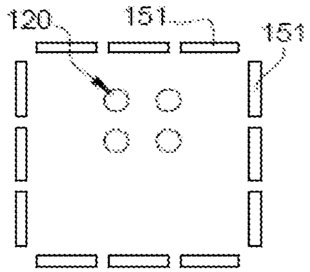

To produce the scribe line(s), instead of a continuous trench producing a closed contour, it is possible to envisage etching a succession of distinct trenches 151 around the back gate(s) 120, In the example of embodiment illustrated in FIG. 4B, the trenches 151 formed are separated from one another and produce a discontinuous contour around a set of back gates 120.

Figure 4C:
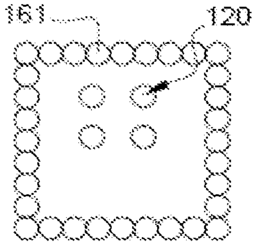

The scribe line is not necessarily limited to a trench topography. This line may be produced in the form of a plurality of holes 161. In the particular example of embodiment illustrated in FIG. 4C, the holes 161 are disposed against one another so as to produce a contour that may be continuous around the gates 120.

Figure 5:
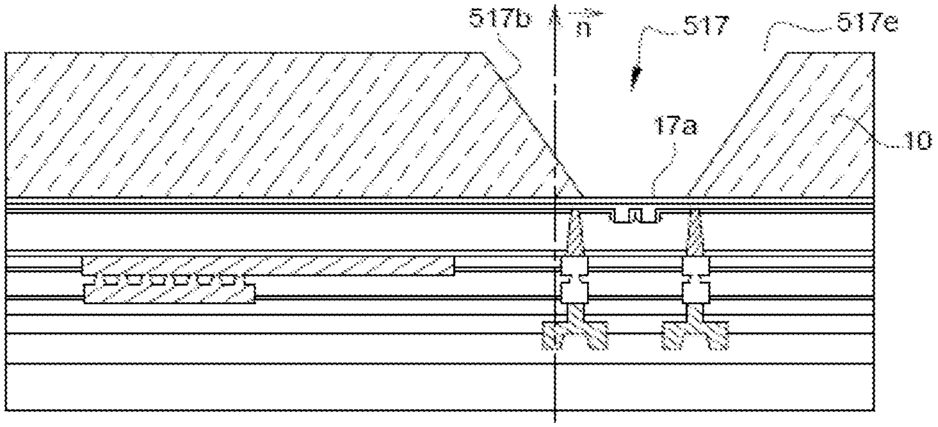
FIG. 5 is used to illustrate the implementation of a flared receiving opening for a quantum device back gate.

As a variant of one or other of the examples of the method described above, and in particular of a step such as presented in relation with FIG. 2E, it is possible to envisage, as in FIG. 5, producing an opening 517 for receiving the back gate having a flared shape. The dimensions of such an opening 517 thus increase the bottom 17*a* located at the insulating layer 11 of the substrate up to its mouth 517*e* of the opening 517 and that may be located at the lower face 10B of the support layer 10. The opening is in the example illustrated provided with lateral walls 517*b* inclined in relation to a normal n to a main plane of said support layer 10 (i.e. a plane passing through the support layer and parallel to the plane [O; x; y; z] given in FIG. 5.

Such an opening shape may make it possible to favour the production of the back gate electrode in that it makes the conformal deposition of the conductive layer 119 easier. To form such an opening 517, an etching of the support layer 10 according to a method of the "tapered via" type may be performed. In particular, an etching of the DRIE-ICP (Deep Reactive Ion Etching—Inductively coupled plasma) type is used. Such a shape also makes it possible to make the production by etching of the opening easier and may also avoid a possible prior step of thinning the support layer 10 of the substrate or reduce the substrate thickness 10 to be removed.

A back gate 520 arrangement formed in such a receiving opening 517 is illustrated in FIG. 6. The back gate 520 is formed of the conductive layer 119 lining the bottom as well as the inclined lateral walls 517*b* however without filling the opening 517. Such an opening 517 shape also makes it possible to limit the mechanical stress at the insulating layer 11 of the support 10 and to thus obtain a better resistance of the conductive layer 119 at the bottom of the opening.

An island quantum device or quantum box such as described above may be required to be integrated for example into a logic circuit adapted to implement a quantum processing of the information or a spintronic circuit, or even into a circuit used in a quantum computer. Such a circuit may also be combined with or comprise one or more transistors, particularly transistors produced in CMOS technology, more particularly transistor produced on thin film.

The invention claimed is:

1. A spin Qbits quantum device comprising:

a substrate of the semiconductor on insulator type, the substrate being provided with a surface semiconductor layer, the surface semiconductor layer being disposed on an insulating layer, and the insulating layer being arranged on an upper face of a semiconductor support layer; and at least one component formed of one or more quantum islands extending in the surface semiconductor layer and of one or more front gates for electrostatic control of the quantum islands, the front gate(s) being disposed on the surface semiconductor layer, the component being further provided with a back electrostatic control gate, the back control gate being formed of a conductive layer lining lateral walls and a bottom of an opening, the opening passing through the semiconductor support layer from a lower face of the support layer opposite the upper face up to the insulating layer of the substrate, the conductive layer being disposed, at a bottom of the opening, against and in contact with the insulating layer of the substrate, the conductive layer being disposed against and in contact with the semiconductor support layer at the lateral walls of the opening, the opening having lateral walls inclined with respect to a normal to a main plane of said support layer, wherein the conductive layer further extends beyond the opening over the lower face of the semiconductor support layer.

2. The spin Qbits quantum device according to claim 1, wherein the opening includes a void volume that extends from the conductive layer up to a mouth of said opening.

3. The spin Qbits quantum device according to claim 1, wherein the conductive layer extends over a given region of the lower face of the support layer and is structured so as to include patterns on the given region.

4. The spin Qbits quantum device according to claim 1, wherein the conductive layer is formed of a stack comprising a conductive bonding layer and a metal layer made of a material having superconducting properties.

5. A method for manufacturing a spin Qbits quantum device according to claim 1, comprising, in this order:

a) providing or producing a structure comprising the substrate equipped with the one or more quantum islands extending in the surface semiconductor layer and with the one or more front electrostatic control gates of the quantum islands disposed on the surface semiconductor layer, b) forming, through the lower face of said support layer, the opening, and the opening having the lateral walls inclined in relation to the normal to the main plane of the support layer and producing one or more scribe holes or trenches in the support layer so as to produce a scribe line in the support layer, the production of the one or more scribe holes or scribe trenches in the support layer and the formation of said opening being performed by etching and concomitantly, and c) depositing the conductive layer in the opening so as to form the back electrostatic control gate, wherein the conductive layer extends beyond the opening over the lower face of the semiconductor support layer.

6. The method according to claim 5, wherein the one or more scribe holes or trench(es) produce a contour around the opening.

7. The method according to claim 5, wherein the deposition of the conductive layer is also performed in the one or more scribe holes or scribe trench(es), the method further comprising:

forming a masking covering said opening, and removing by etching the conductive layer facing the scribe trench(es) or holes while protecting the opening by way of the masking.

8. The method according to claim 5, further comprising, after c):

gluing an adhesive tape against the lower face or a layer or a stack disposed on the lower face of the support layer, and stretching the adhesive tape so as to produce a division of the substrate at the scribe line(s).

9. The method according to claim 5, wherein the opening is produced by deep etching through a mask.

10. The method according to claim 5, wherein step one or more front electrostatic control gates are covered with a stack of layers and wherein between a) and b) a temporary handle support is glued on the stack, the method further comprising, after c), removing the temporary support.

* * * * *